Oct. 10, 1950 L. T. AKELEY 2,525,440
PROCESS TIMER
Filed Sept. 10, 1948 2 Sheets-Sheet 1
Fig.1.
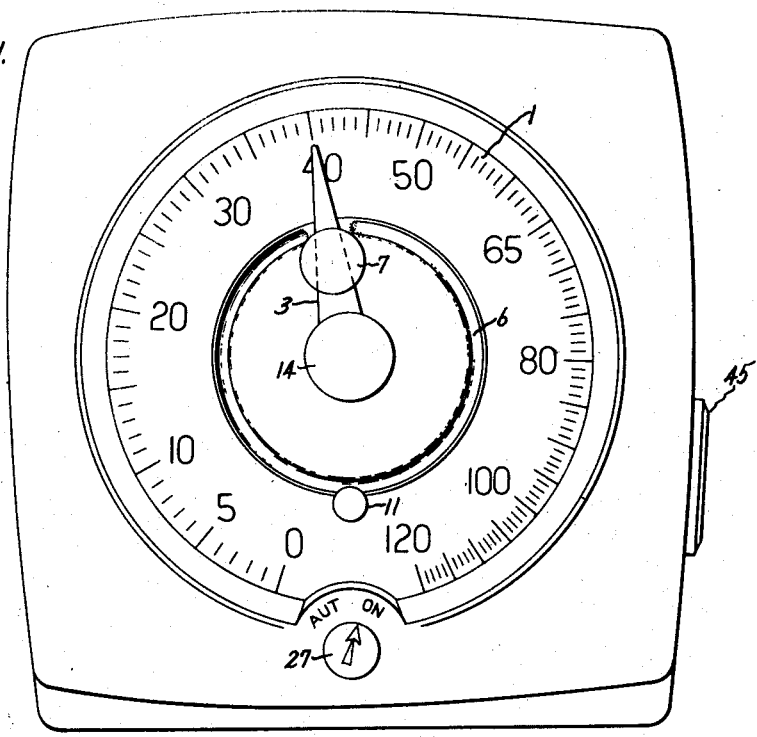
Fig.2.
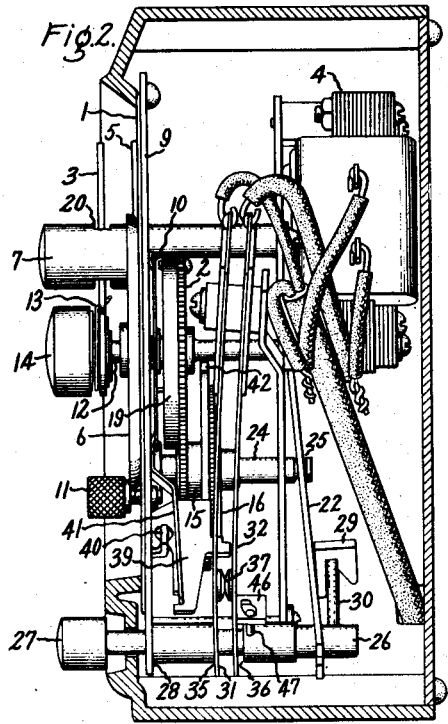
Fig.4.
Inventor:
Lloyd T. Akeley,
by Prowell S. Mack
His Attorney

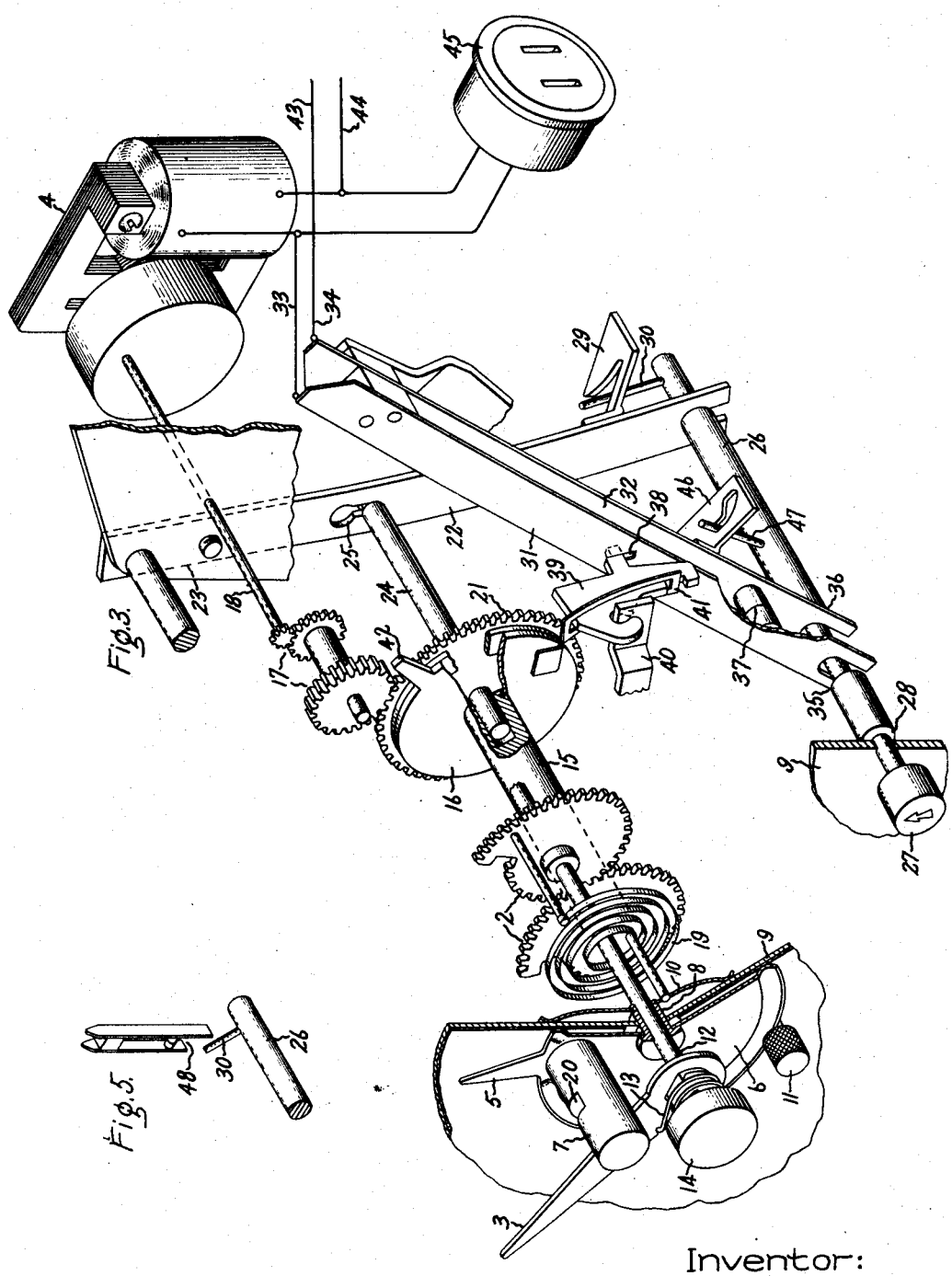

Patented Oct. 10, 1950

2,525,440

UNITED STATES PATENT OFFICE 2,525,440

PROCESS TIMER

Lloyd T. Akeley, Lynn, Mass., assignor to General Electric Company, a corporation of New York Application September 10, 1948, Serial No. 48,727

8 Claims. (Cl. 161—1)

My invention relates to a process timer such, for example, as may be employed for timing photograph exposures and the like, and an object is to provide a reliable low-cost timer of the class described with few parts, and which is exceptionally convenient for the user.

The features of my invention which are believed to be novel and patentable will be pointed out in the claims appended hereto. For a better understanding of my invention reference is made in the following description to the accompanying drawings in which Fig. 1 represents a face view of my encased timer; Fig. 2 represents a sectional side view of the timer in its case; Fig. 3 is a perspective exploded view of the operating mechanism; Fig. 4 represents different positions of the switch mechanism in full and dotted lines; and Fig. 5 represents a switch for additional control of the motor.

On the front of the casing there is a time graduated scale 1 which will be assumed to be graduated in seconds. It will be noted that the graduations near the zero time indication are spaced further apart than at the upper end of the scale and that this change in spacing is progressive. This enables more accurate setting for short time intervals and still allows for a longer time scale than would be the case if the graduations were uniform and spaced as at the low end of the scale. This arrangement is permitted by reason of the use of variable ratio scroll gearing 2 between the time indicating pointer 3 and the driving timer motor 4. Cooperating with time dial 1 is the timing pointer 3, just mentioned, and a time setting pointer 5. The time setting pointer is hidden behind pointer 3 in Fig. 1, but is secured to a disk 6 which may be rotatively adjusted by a handle 7 thereon to position setting pointer 5 at any time indication on the scale 1. The disk 6 has a hub bearing 8 through the front plate 9, and a friction spring 10 secured to such hub bears against the back of the front plate. If necessary, a thumbscrew 11 may be provided to engage the periphery of disk 6 more securely to hold it in any adjusted position when the thumbscrew is tightened.

The hub 8 is hollow and serves also as a bearing for a shaft 12 for the timing pointer 3. Preferably, pointer 3 is not fastened rigidly to shaft 12 but has a key fit which allows a small amount of rotary lost motion thereon and is urged to the limit of such lost motion in an upscale direction by a spring 13 having one end secured to the shaft 12 by means of a cap 14 and the other end bearing against one edge of pointer 3. The purpose of this resilient lost motion connection of the pointer 3 on its shaft 12 will become apparent as the description proceeds.

Shaft 12 is geared through the scroll gears 2 to a shaft 15 which connects through a friction clutch at 16 to a gear train 17 leading to the low speed output shaft 18 of the synchronous timer motor 4. The gear ratio is such that when the motor is operating and the clutch engaged, the pointer 3 will be driven in a counterclockwise or downscale direction at a variable rate corresponding to the non-uniform, spaced time graduations on time dial 1. The motor operates at a uniform rate and the nonuniform rate of the pointer is produced by the scroll gears at 2.

When the friction clutch at 16 is released, the pointer 3 is caused to rotate upscale to the position of setting pointer 5 from any other position below such setting by reason of a spiral spring 19, the inner end of which is fastened to and rotates with spring washer 10 whenever setting pointer 5 is adjusted and the outer end of which is fastened to the scroll gear on shaft 12. This spring is initially adjusted to be under some tension when pointers 5 and 3 are in alignment and the spring is further tensioned whenever timer motor 4 drives the timer pointer 3 downscale from setting pointer 5. By reason of this arrangement whenever the clutch is released and pointer 3 is downscale from pointer 5, the pointer 3 will snap upscale to the position of pointer 3 where it will be stopped because it will then strike against the handle 7 of pointer 3 as a stop. The handle 7 is preferably slotted as shown at 20 to receive pointer 3 so that the two pointers will be aligned when pointer 3 is in this stopped position. Such position is represented in Fig. 1. The resilient lost motion connection of pointer 3 on its shaft 12 is to prevent damaging shock when pointer 3 is snapped against the stop handle 7.

The gear 21 which comprises the rear portion of the friction clutch at 16 is normally pressed toward the front member of such clutch by a spring 22 which spring is fastened at its upper end at 23 to the stationary frame structure of the timer. A shaft 24 on which clutch member 21 is fastened has a bearing in a keyhole slot 25 of the spring 22. The shaft 24 is recessed at such bearing so that it, with its gear clutch member 21, can be moved endwise by the spring to engage or disengage the clutch. Such movement of the spring is provided for at its lower end which is slotted and straddles a reduced portion of a shaft 26. Shaft 26 may be pushed endwise and rotated and extends forward through the front plate and there terminates in a thumbpiece 27 to enable it to be turned or pushed by the user of the timer. It will be evident that pushing inward or to the right in Fig. 3 on push button 27 will move the lower end of spring 22 accordingly by reason of the shoulder on said shaft which engages the straddled portion of the spring. This action is made sufficient to release the clutch and allow pointer 3 to move to the position of pointer 5 if not already in such position. Releasing the push button reengages the clutch, the spring 22 moving shaft 26 to the left or forward until another shoulder at 28 on the shaft 26 engages the front plate 9. Thus, the user by pushing in and releasing button 27 may disengage and reengage the clutch. It is to be noted that the clutch spring 22 also supplies the bias for returning the push button shaft 26 forward when it is released.

In the form of the invention shown in Fig. 3 the user may also accomplish the same results by limited rotation of push button 27 and its shaft 26. This is by reason of the fact that the spring has fastened to it a camming member 29 which is engaged by a camming pin 30 secured in shaft 26. In the rotary position of shaft 29 shown in Fig. 3 the clutch at 16 is engaged. By turning shaft 26 about 30 degrees to the right or clockwise, finger 30 engages the rear cam edge of the slot in part 29 and moves the spring 22 to the rear, thus disengaging the clutch. Turning the shaft back to the left again reengages the clutch. The clutch open rotary position of shaft 26 is shown in Fig. 2.

Also cooperating with the endwise and rotary motion of shaft 26 is a switch composed of resilient conductor members 31 and 32 insulated from each other and secured to some stationary part of the timer structure at their upper ends and connected to suitable circuit wires 33 and 34. The lower ends of these switch members are forked and straddle a reduced portion of the shaft 26 between shoulders 35 and 36. The resilient switch arms have normally open cooperating contacts 37 between them near their lower ends. Switch arm 31 has an opening 38 therein into which a catch member 39 made of insulating material extends. The catch member 39 has a pivoted engagement with a stationary bar 40 and is biased to rotate to a limited extent about such pivot in a counterclockwise direction by a spring member 41 which straddles the member 39 and engages in a notch near its lower end. The upper end of spring 41 is fastened to the back wall of front plate 9 as is likewise bar 40. It will be noted that the finger of catch member 39 which extends into the opening 38 in switch member 31 has its upper edge stepped as best shown in Figs. 2 and 4, and in the position shown in Fig. 3 and in full lines in Fig. 4 this step engages against the near side of the upper end of the opening 38 and thus prevents forward movement of this switch blade. The switch contacts at 37 are shown closed and the catch holds them closed and prevents blade 31 springing forward to its biased position against shoulder 35.

The forward member of clutch 16 has on it a finger 42 which at the end of a timing period is adapted to engage the upper right-hand surface of catch or trigger member 39 and rotate such member clockwise a few degrees as shown in dotted lines in Fig. 4, so that the step which engages and holds spring switch arm 31 is lowered sufficiently to release arm 31 and allow it to flex to the left so that its lower end engages shoulder 35. Such position of switch arm 31 and trigger member 39 is indicated in dotted lines in Fig. 4. Under this condition the contacts at 37 are open for the rotary position of shaft 26 shown in Fig. 3, since switch member 32 is biased to remain against shoulder 36 and does not move to the left. With the control shaft 26 in the rotative position represented in Fig. 3 and which is indicated by the pointer on its knob 27 pointing to "Aut." meaning "automatic," the opening of the contacts 37 by the action just described takes place automatically at the end of a timing interval when the pointer 3 is driven counterclockwise to the zero end of the time scale at which time finger 42 on clutch member 16 releases catch 39. As the switch is wired in Fig. 3 this opens the energizing circuit of motor 4 and also the circuit to lamps or other load devices to be timed which may be plugged into outlet 45. Lines 43 and 44 indicate the connection that is made to the source of supply. Such automatic timing operation may now be repeated simply by pushing in on push button 27 and releasing it. As previously explained, pushing in on shaft 26 for the automatic rotary position of shaft 26 releases the clutch 16. All rotary parts of the mechanism connected in driving relation with the near side of the clutch as viewed in Fig. 3 are thus released and are now driven by spring 19 until timing pointer 3 rotating clockwise strikes stop handle 7. Finger 42 rotates counterclockwise away from trigger 39 a corresponding distance. The pushing in of shaft 26 moves switch blades 31 and 32 to the right, the contacts at 37 remaining open since 32 is biased against and moves to the right with shoulder 36. The trigger 39 is thus released both by reason of the simultaneous withdrawing of finger 42 and the movement of switch blade 31 to the right so that spring 41 rotates the trigger 39 counterclockwise from dotted line position, Fig. 4, to full line or latching position and when the push button 27 is released, it catches and holds switch blade 31 in the position shown at full lines in Fig. 4 and closes the contacts at 37, the shaft 26 moving to the left under the tension of clutch spring 22 at the same time that the clutch is reengaged. This initiates a timing operation and the motor thus starts and drives pointer 3 to zero on its scale in the time indicated on dial 1 by the position of setting pointer 5. At the end of such time interval finger 42 moves trigger 39 to release switch blade 31 to open the contacts at 37 to stop the motor and the timing operation and deenergizes the load circuit 45. Any different time interval within the range of operation of the device is available by changing the position of setting pointer 5 and its stop handle 7. It is to be noted that during each automatic timing operation the motor 4 winds the spring 19 for each subsequent resetting operation.

The user of such a device will occasionally wish to energize the load circuit designated by outlet 45 momentarily or indefinitely without timing the operation. For example, if used as a photographic timer where the load is a developer light, the user may wish to use the same light for preliminary focusing purposes. Provision is made by the turning of push button 27 and its shaft 26 to the right, so that the pointer on knob 27 indicates "On," for energizing the load circuit at will without utilizing the automatic timing features. It was previously explained that so turning the shaft 26 to the right demeshes the clutch 16 by the camming action of parts 29 and 30. A somewhat similar arrangement is employed for closing switch contacts 37 To this end switch blade 32 has a slotted cam member 46 secured thereto which cooperates with a pin 47 extending from shaft 26. When the timer mechanism is in the condition represented by dotted lines in Fig. 4 with the contacts at 37 open and the timing pointer 3 at the zero position, the contacts 37 may be closed by turning shaft 26 to the right. The cam 46 and pin 47 push the switch blade 32 to the left and close the contacts. This condition is represented in Fig. 2. At the same time the clutch 16 is disengaged so that while the motor 4 will run, it runs idle and does not drive through the clutch. If the clutch were not disengaged under this condition, needless wear or damage to the motor and the mechanism might result.

When the shaft 26 is thus turned to the right for focusing purposes or the like, the clutch being disengaged, the spring 19 returns the timer pointer 3 and rotary parts connected thereto to the set position with pointer 3 against stop 7. However, when the shaft 26 is turned back to the automatic position again, the switch contacts 37 open and remain open until the shaft is pushed inwardly to move switch blade 32 to the right where it will be retained by latch trigger 39. Hence, following an "on" operation an automatic timing operation is started in the normal manner by pushing in on button 27 and releasing it. Thus, use of the "on" feature described normally produces no change in a subsequent manner of initiating an automatic timing operation, and the manner of use and the instructions for its use remain simple and unconfusing even though the variety of operations described are all performed by the single button 27. However, the button 27 may be pushed inwardly without damage when turned to the "on" position by a slightly harder push than is normally required to the extent necessary for the trigger 39 to latch switch blade 31 in its closed position so that when the knob is turned back to "Aut." an automatic timing operation is immediately started by the reengagement of the clutch. Also, the button 27 may be turned from "Aut." to "On" when the switch contacts 37 are closed during an automatic timing operation without damage to the mechanism. The reason why these unusual operations may be performed without damage is primarily because of the resiliency of spring 22 and of the switch blades 31 and 32. While the feature just mentioned is desirable from the point of view of providing a device which is not easily damaged, it may also be used to extend the time range of the device as illustrated by the following:

Let us suppose that with the 120-second range timer described it becomes desirable to obtain a 180-second time interval. The pointer 5 would be set for the full range of 120 seconds and a timing operation started in the usual way by pushing in on button 27 with its arrow turned to "Aut." When the pointer has been driven back to 60½ on scale 1, button 27 is given a quick turn to "On" and immediately turned back to "Aut." This momentarily releases clutch 16 and resets the pointer 3 to full scale without opening switch contacts 37 and the timing operation is immediately resumed and thus extended by approximately 60 seconds. The time lost during this intermediate resetting operation can easily be made to approximate one-half second and is taken into account to minimize the error. When the shaft 26 is turned to "Aut." or "On," it will remain in such position until turned back again.

Instead of demeshing the clutch for the "On" or focusing condition described, I may open the motor circuit instead and in Fig. 5, I have indicated how the finger 30 instead of operating on the clutch spring 22 as in Fig. 3, opens a switch 48 when shaft 26 is turned to the right. This switch 48 will then be connected in series only with motor 4, and not in the load circuit, so that the load circuit may be turned on by rotating shaft 26 to the right without operating the motor or disengaging the clutch.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. A timer comprising a scale graduated in time units from zero upward, a time setting stop pointer manually adjustable along said scale, a timer pointer indicating on said scale and movable along said scale between zero and said setting pointer, an electric timer motor, a drive train between said motor and timer pointer including a normally engaged but releasable clutch for driving said timer pointer downscale when the motor is energized and the clutch engaged, a switch for energizing said motor biased to an open position, a movable latch biased to latching position for holding said switch closed, latch releasing means advanced through said clutch for moving said latch to switch releasing position when said timer pointer has been driven to zero scale position, a spring wound by said motor through said clutch for moving said timer pointer upscale to the setting pointer and retracting said latch releasing means when the clutch is disengaged, and a push button actuator biased in one direction but movable against said bias to disengage said clutch and when released to close and latch said switch in closed position.

2. A timer comprising a scale graduated in time units from zero upward, a timer pointer movable along said scale, a time setting pointer manually adjustable along said scale and serving as a stop to limit the upscale movement of said timer pointer, an electric timer motor, a drive train between said motor and timer motor including a normally engaged disengageable clutch for driving said timer pointer downscale when the motor is energized and the clutch engaged, a source of supply, a load circuit, a switch biased to open position which when closed connects said source of supply to said motor and load circuit, a movable latch biased to latching position for latching said switch in closed position against its bias, latch releasing means advanced by said drive train through said clutch for moving said latch to releasing position when the timer pointer has been driven downscale to zero scale position, a spring wound by said motor through said clutch for moving said timer pointer upscale to the setting pointer and for retracting said latch releasing means when said clutch is disengaged, and a push button actuator biased in one direction and movable in the opposite direction against such bias to disengage said clutch and move said switch while open to latch engaging position and when released to permit engagement of said clutch and the closing of said switch in latched position.

3. A timer comprising a scale graduated in time units from zero upward, a timer pointer movable along and indicating on said scale, a time setting pointer manually adjustable along said scale and serving as a stop to limit the upscale movement of said timer pointer, an electric timer motor, a drive train between said motor and pointer including a disengageable clutch for driving said timer pointer downscale at a rate corresponding to the time graduations of said scale when the motor is energized and the clutch engaged, a switch having resilient contact arms biased apart to open switch position through which the motor is energized when the switch is closed, a movable latch biased to latching position for engagement with one of said switch arms for latching the switch closed against the bias of such arm, latch releasing means advanced by said drive train through said clutch for moving said latch to released position when the timer pointer has been driven downscale to zero scale position, a spring wound by said motor through said clutch for moving the timer pointer upscale against said stop and for retracting said latch releasing means when the clutch is disengaged, a push button actuator associated with both resilient switch arms, a common spring for biasing said clutch to engaging position and biasing said actuator in one direction such that pushing in on said actuator against such bias disengages said clutch and moves both switch arms with the switch open to a latch-engaging position such that when said actuator is released, the clutch is engaged and the switch is closed and latched closed.

4. A timer having an electric timer motor for performing the timing operation thereof, a timer pointer driven by said motor during such timing operations, a disengageable clutch between the motor and pointer for permitting of the resetting of said pointer for a subsequent timing operation, a clutch operating member, a spring wound by said motor through said clutch to perform such pointer resetting operation when the clutch is disengaged, a switch in the motor circuit, means for causing the automatic opening of said switch at the end of a timing interval, and a manual actuator for initiating timing operations, said actuator comprising a shaft having limited axial movement between two positions with means for resiliently biasing it to one of such endwise positions so that its endwise operation corresponds to that of a push button and having non-biased limited rotational movement between first and second rotary positions independent of the axial movement thereof, said actuator being associated with both said switch and said clutch operating member such that in the first rotary position its push button operation from and to its biased endwise position disengages and reengages the clutch to allow the spring to reset the pointer and recloses the switch to initiate a subsequent timing operation, and in the second rotary position assures the closing of said switch without initiating a timing operation.

5. A timer as claimed in claim 4, in which turning of the actuator to said second rotary position causes the closing of said switch if open and the disengaging of said clutch if engaged.

6. A timer as claimed in claim 4, in which the turning of the actuator from the first to the second rotary position during a timing operation suspends the timing operation until the actuator is turned back to the first rotary position.

7. A timer as claimed in claim 4, in which when the actuator is in the second rotary position the push button operation of such actuator may be performed without initiating a timing operation.

8. A timer as claimed in claim 4, in which the association between the actuator and switch and clutch which is effective by endwise movement of the actuator consists of shoulders on the shaft and engaging shoulders on the switch and clutch operating member, and the association which is effective by rotary movement of the actuator includes cooperating camming members on the shaft and on the switch.

LLOYD T. AKELEY.

REFERENCES CITED

The following references are of record in the file of this patent:

UNITED STATES PATENTS

| Number | Name | Date |
|---|---|---|
| 2,223,207 | Ellis | Nov. 26, 1940 |